United States Patent
Magarill et al.

(10) Patent No.: US 6,643,077 B2
(45) Date of Patent: Nov. 4, 2003

(54) METHODS AND APPARATUS FOR POSITIONING OPTICAL PRISMS

(75) Inventors: Simon Magarill, Cincinnati, OH (US); Blake E. Sansbury, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/122,558

(22) Filed: Apr. 15, 2002

(65) Prior Publication Data

US 2002/0154420 A1 Oct. 24, 2002

Related U.S. Application Data

(60) Provisional application No. 60/285,342, filed on Apr. 20, 2001.

(51) Int. Cl.[7] ................................................. G02B 7/18
(52) U.S. Cl. ........................................................ 359/831
(58) Field of Search ................................. 359/831, 834, 359/835, 837, 483, 485, 487

(56) References Cited

U.S. PATENT DOCUMENTS

| | | | |
|---|---|---|---|
| 4,381,145 A | 4/1983 | Momiyama et al. | |
| 5,835,276 A | 11/1998 | Asai et al. | |
| 6,067,195 A | 5/2000 | Hirunuma et al. | |
| 6,122,103 A | 9/2000 | Perkins et al. | |
| 6,183,091 B1 * | 2/2001 | Johnson et al. | 353/20 |
| 6,273,567 B1 * | 8/2001 | Conner et al. | 353/20 |
| 6,304,302 B1 * | 10/2001 | Huang et al. | 349/9 |
| 6,309,071 B1 * | 10/2001 | Huang et al. | 353/31 |
| 6,398,364 B1 * | 6/2002 | Bryars | 353/31 |
| 6,490,087 B1 * | 12/2002 | Fulkerson et al. | 359/487 |

FOREIGN PATENT DOCUMENTS

JP          10-253922          9/1998

OTHER PUBLICATIONS

M. Robinson, J. Kogan, G. Sharp, and J. Birge, "High Contrast Color Splitting Architecture Using Color Polarization Filters," *SID 00 Digest*, pp. 92–95.
E. Strupp and M. Brennesholtz, "Reflective polarizer technology," *Projection Displays*, 1999, pp. 129–133.
Private Line Report on Projection Display, vol. 7, No. 11, Jul. 20, 2001, pp. 6–8.

* cited by examiner

*Primary Examiner*—Mohammad Sikder
(74) *Attorney, Agent, or Firm*—Maurice M. Klee; Bruce E. Black

(57) ABSTRACT

An optical assembly (11) is formed by individually positioning a plurality of prisms (15) using mechanical reference surfaces (19) which are associated with the prism's diagonal (13) and are preferably formed by extensions of a first sub-prism (17A) beyond a second sub-prism (17B). The mechanical references surfaces and a first side of the prism engage fixed mechanical references (23) associated with a housing. A locking element (21) engages a second side of the prism and forces the mechanical reference surfaces and the first side of the prism against the fixed mechanical references to achieve accurate positioning of the prism's diagonal (13).

14 Claims, 5 Drawing Sheets

METHODS AND APPARATUS FOR POSITIONING OPTICAL PRISMS

CROSS REFERENCE TO RELATED PROVISIONAL APPLICATION

This application claims the benefit under 35 USC §119(e) of U.S. Provisional Application No. 60/285,342, filed Apr. 20, 2001, and entitled "Separate Quad," the contents of which are incorporated herein in their entirety.

FIELD OF THE INVENTION

This invention relates to methods and apparatus for accurately positioning one or more optical prisms in an optical assembly. More particularly, the invention relates to accurately positioning the diagonal of an optical prism where the diagonal divides (or is adapted to divide) incident light into a transmitted portion and a reflected portion. Accurate positioning of such a light-dividing diagonal is of importance since misalignment of the diagonal causes misdirection of reflected light and the introduction of parallax into transmitted light.

BACKGROUND OF THE INVENTION

Optical prisms having light-dividing diagonals are used in a variety of optical systems. In recent years, a particularly important application for such prisms has been in projection systems which employ Liquid-Crystal-On-Silicon (LCoS) panels.

The architecture and principals of operation of one such system are described in M. Robinson, J. Kogan, G. Sharp, and J. Birge, "High Contrast Color Splitting Architecture Using Color Polarization Filters," SID 00 DIGEST, pages 92–95. This system employs a COLORQUAD™ prism assembly produced by Colorlink Inc., of Boulder, Colo. This prism assembly in conjunction with three LCoS panels provides excellent contrast and acceptable throughput, and a rear screen projection TV with an optical engine utilizing such a prism assembly has been demonstrated (CES, Las Vegas, Nev., 2001).

Examples of other architectures employing prisms having light-dividing diagonals can be found in, for example, Conner et al., U.S. Pat. Nos. 6,273,567 B1, Huang et al., 6,304,302 B1; Huang et al., 6,309,071 B1; Johnson et al., 6,183,091 B1; and Japanese Patent Publication No. 10-253922.

The above COLORQUAD™ prism assembly suffers from two major problems. First, the assembly consists of four polarization beam splitters (PBSs) and five COLORSELECT™ polarization filters (Colorlink Inc., Boulder, Colo.). All of these components are optically cemented to each other. Optical cementing is a non-reversible process, which means that if something is wrong with any of the cemented components (scratched, displaced, tilted, etc.), the entire assembly must be rejected. Accordingly, the COLORQUAD™ assembly suffers from low yields and high assembly costs.

The second major problem with the COLORQUAD™ assembly relates to its manner of use. In an optical engine, three LCoS panels are used with one COLORQUAD™ assembly to create a color image on a screen. At the screen, all three images (red, green and blue) should coincide with each other with a very high degree of accuracy, which can be achieved by tilting and displacing of the panels (convergence). After completing this process the panels are fixed in space.

Simultaneously, red, green and blue light patches from the illuminator should overlap the corresponding panels. Any misalignment in the COLORQUAD™ assembly cannot be compensated for by moving the panels themselves (they are fixed as described in the previous paragraph) and will require increasing the light patch from the illumination system to provide complete illumination of all three panels. This significantly reduces the throughput of the optical engine from its theoretical maximum value.

The overlapping of images through the illumination path of the COLORQUAD™ assembly depends on the accuracy with which the assembly is constructed and cannot be compensated for once the assembly process has been completed. In the other words, the COLORQUAD™ assembly must be assembled with very high accuracy, which requires active alignment of the components during the process of cementing. Like the problem of rejecting an entire assembly due to damage of any one component, active alignment during cementing increases the final cost of the COLORQUAD™ assembly.

In view of the foregoing, it is an object of the present invention to provide improved methods and apparatus for positioning of optical prisms.

It is a further object of the invention to provide improved methods and apparatus for positioning a plurality of optical prisms without the need for cementing those prisms to one another.

SUMMARY OF THE INVENTION

In accordance with a first aspect, the invention provides an optical assembly comprising:

(A) at least one prism which has a top, a bottom, a plurality of sides, and a diagonal which has a top and a bottom, said prism comprising:
  (i) first and second sub-prisms, each of which has a surface that is parallel to the diagonal, and
  (ii) a first mechanical reference surface for the top of the diagonal and a second mechanical reference surface for the bottom of the diagonal; and (B) a housing comprising:
  (i) a plurality of fixed mechanical references, each of which is adapted to engage one of the first mechanical reference surface, the second mechanical reference surface, or a first side of the prism; and
  (ii) a locking element which engages a second side of the prism and presses the first side and the first and second mechanical reference surfaces against the plurality of fixed mechanical references.

In accordance with a second aspect, the invention provides a prism which has a top, a bottom, a plurality of sides, and a diagonal which has a top and a bottom, said prism comprising:

(A) first and second sub-prisms, each of which has a surface that is parallel to the diagonal;

(B) a first mechanical reference surface for the top of the diagonal which comprises an extension of the parallel-to-the-diagonal surface of the first sub-prism above the parallel-to-the-diagonal surface of the second sub-prism; and (C) a second mechanical reference surface for the bottom of the diagonal which comprises an extension of the parallel-to-the-diagonal surface of the first sub-prism below the parallel-to-the-diagonal surface of the second sub-prism.

In accordance with a third aspect, the invention provides a method for positioning a prism, said prism having a diagonal which has a top and a bottom, said method comprising:

(A) providing a first mechanical reference surface for the top of the diagonal;

(B) providing a second mechanical reference surface for the bottom of the diagonal;

(C) providing a plurality of fixed mechanical references, each of which is adapted to engage one of the first mechanical reference surface or the second mechanical reference surface; and (D) applying a force to the prism to press the first and second mechanical reference surfaces against the plurality of fixed mechanical references.

In accordance with a fourth aspect, the invention provides a method for positioning a prism, said prism (i) having a diagonal which has a top and a bottom and (ii) comprising first and second sub-prisms, each of which has a surface that is parallel to the diagonal, said method comprising:

(A) providing a first mechanical reference surface for the top of the diagonal which comprises an extension of the parallel-to-the-diagonal surface of the first sub-prism above the parallel-to-the-diagonal surface of the second sub-prism;

(B) providing a second mechanical reference surface for the bottom of the diagonal which comprises an extension of the parallel-to-the-diagonal surface of the first sub-prism below the parallel-to-the-diagonal surface of the second sub-prism;

(C) providing a plurality of fixed mechanical references, each of which is adapted to engage one of the first mechanical reference surface or the second mechanical reference surface; and (D) applying a force to the prism to press the first and second mechanical reference surfaces against the plurality of fixed mechanical references.

The foregoing summary of the various aspects of the invention, as well as the claims appended hereto, refer to the prism of the invention as having a "top" and a "bottom". The summary and the claims also use the terms "above" and "below." This "top", "bottom", "above", and "below" terminology has been adopted to facilitate the description of the invention and is not intended to and should not be interpreted as limiting the invention in any manner. In particular, this terminology should not be interpreted as requiring any particular orientation of the prism with respect to gravity, e.g., the top of the prism need not be "up" in a gravitational sense, but could be "sideways" or even "down" in a gravitational sense. These considerations also apply to the rest of the specification and the drawings.

Additional features and advantages of the invention are set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate various embodiments of the invention, and together with the description serve to explain the principles and operation of the invention.

Figure 1:
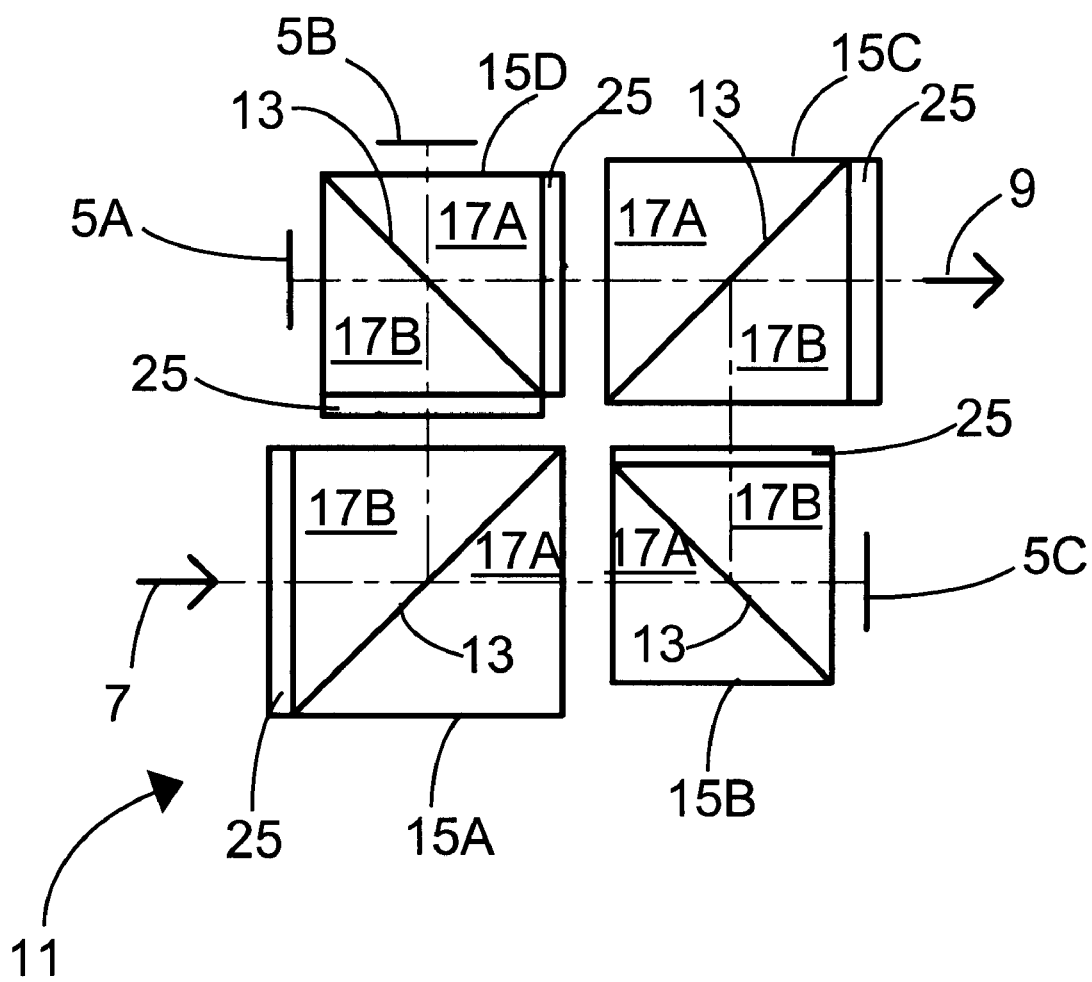
FIG. 1 is a schematic diagram illustrating the four components of a "Separate Quad" constructed in accordance with the invention.

The reference numbers used in the drawings correspond to the following:
5A blue LCoS
5B red LCoS
5C green LCoS
7 light from illumination
9 light to projection
11 overall optical assembly
13 prism diagonal
15A prism
15B prism
15C prism
15D prism
17A longer sub-prism
17B shorter sub-prism
19A top mechanical reference surface
19B bottom mechanical reference surface
21 locking elements (represented by open arrows in FIG. 3 with the point of the arrow engaging a side of the prism)
23 fixed mechanical references (represented by closed arrowheads in FIG. 3 with the point of the arrowhead engaging either a mechanical reference surface or a side of the prism)
25 filter
27 wire grid polarizer

DETAILED DESCRIPTION OF THE INVENTION

In certain embodiments, the present invention provides an opto-mechanical assembly 11 (also referred to herein as a "subassembly") of four prisms or prism units 15, which together form a "Quad" or "Separate Quad" for use in a reflective LCoS projection system. As shown in FIG. 1, the prism subassembly 11 consists of four pre-assembled components 15A, 15B, 15C, and 15D.

Components 15A, 15B, 15C, and 15D are each a polarization beam splitter (PBS) with components 15A, 15B, and 15C having one optically cemented polarization filter, while component 15D has two cemented filters. In each case, the polarization filters can be COLORSELECT™ filters produced by Colorlink Inc., of Boulder, Colo. These four components are assembled in the mechanical housing for the light engine to the required accuracy without any additional alignment. The most critical optical elements of the Quad from a positioning point of view are the diagonals 13 of the four polarization beam splitters.

Figure 2:
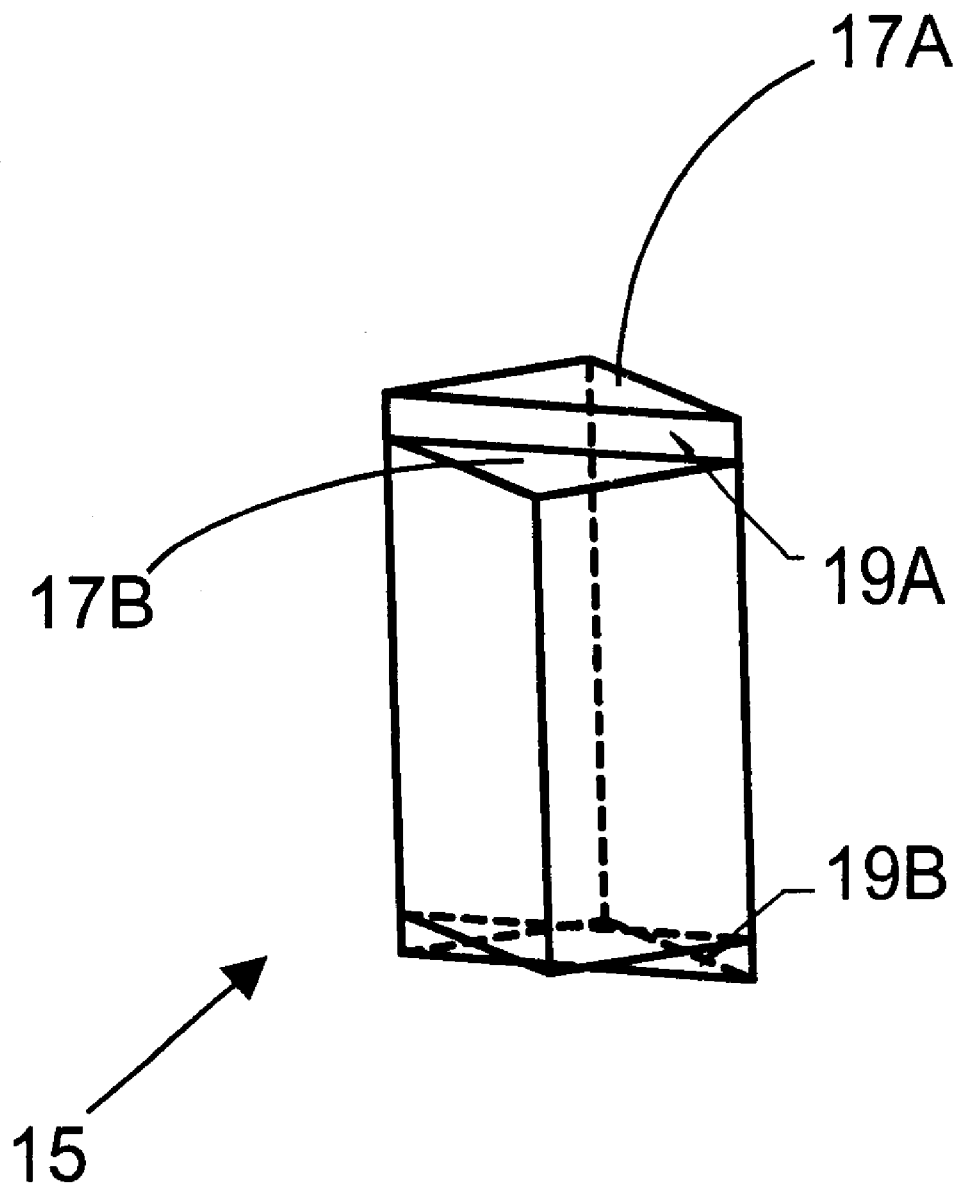
FIG. 2 is a perspective drawing of a prism, specifically, a polarization beam splitter (PBS), constructed in accordance with the invention.

To provide high accuracy for component positioning, the PBS preferably has the shape shown in FIG. 2. Each PBS consists of two cemented right angle prisms or sub-prisms (17A, 17B), with a polarization coating on the PBS's diagonal. The polarization coating can, for example, be a multilayer structure as used in the MacNeille polarizing cube (see E. Stupp, M. Brennesholtz, Projection Displays, 1999, p. 130–133) or a polarization birefringence film such as that manufactured by 3M under the tradename 3M CARTESIAN POLARIZER (see Private Line Report on Projection Display, Volume 7, No. 11, Jul. 20, 2001, pages 6–8).

As can be seen in FIG. 2, one sub-prism 17A is taller (longer) than the other sub-prism 17B, which allows the open or extended sections of the diagonal surface of the longer sub-prism to be used as mechanical reference surfaces 19A and 19B for positioning.

The housing for the Separate Quad subassembly preferably consists of a top plate, bottom plate and four locking elements 21 (e.g., spring-loaded lockers), one per each PBS. The top and bottom plates have four sets of three pads (mechanical references), with each set forming a base for its respective prism 15A, 15B, 15C, and 15D. In each set, two pads are in contact with the PBS's diagonal and one in contact with a side surface of the PBS, as shown in FIG. 3 (pads or mechanical basis shown in the drawing as black triangles/arrowheads).

Figure 3:
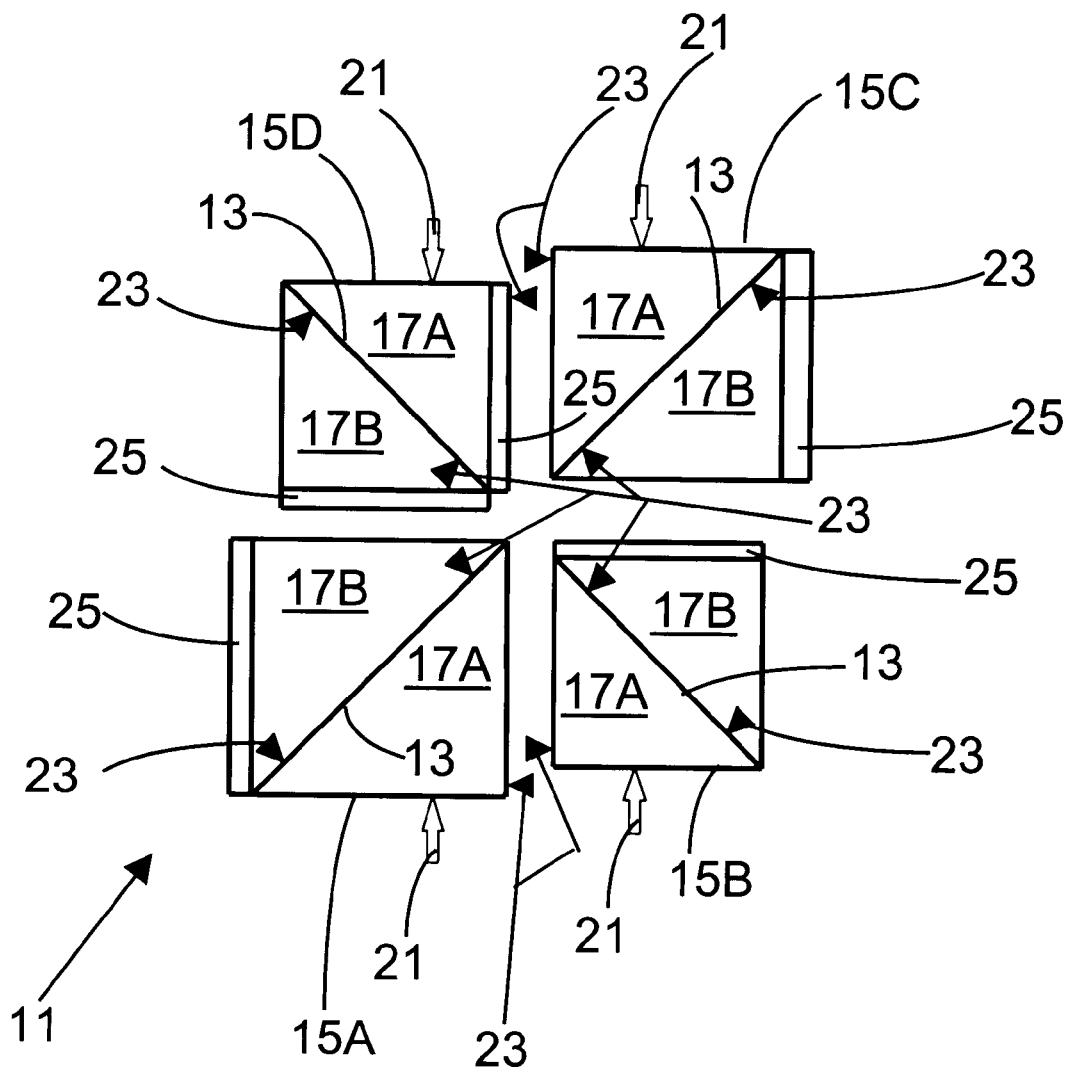
FIG. 3 is a schematic diagram illustrating the position of mechanical bases and locking elements, e.g., spring-loaded lockers, for use with the Separate Quad of FIG. 1.

Each PBS is placed against its own set of pads as shown in FIG. 3. The spring-loaded locker forces the PBS to slide along the diagonal until full contact between the glass and the mount is achieved. In this method of assembly, the position of each PBS is determined by the position of the mechanical pads which can be fabricated to the required accuracy.

Figure 4:
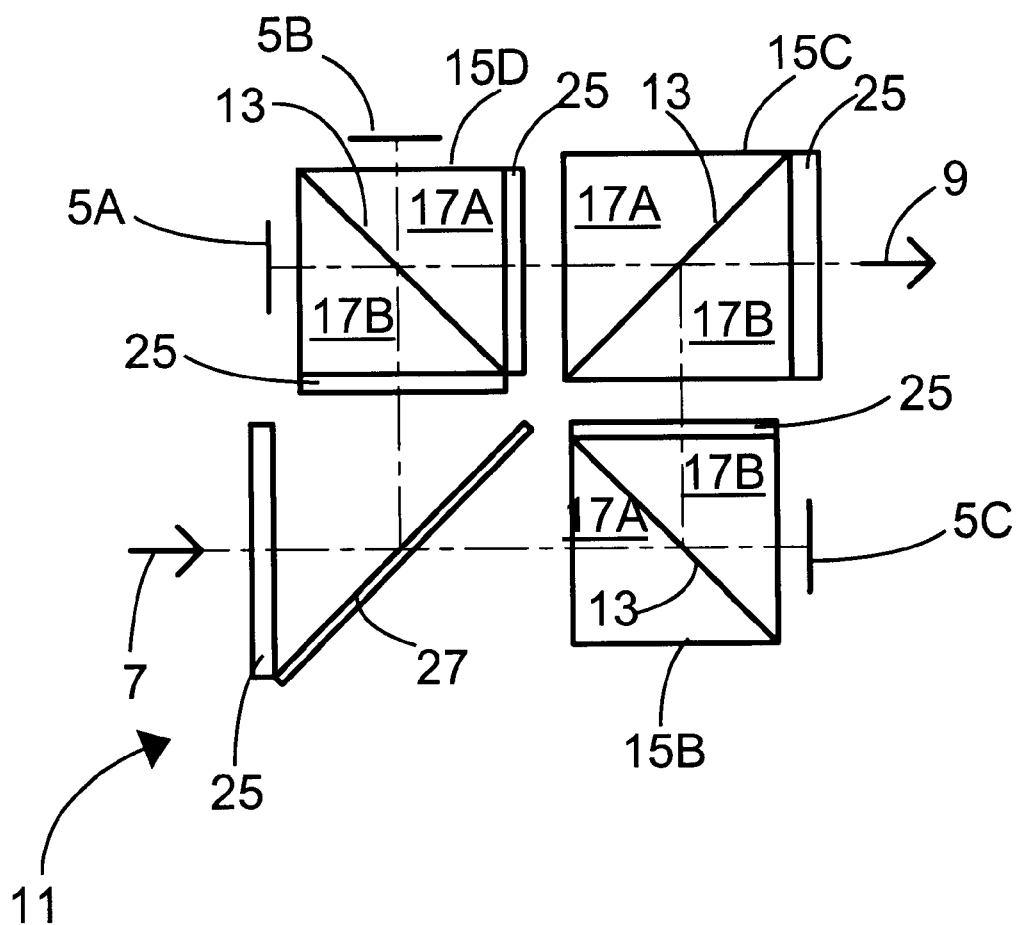
FIG. 4 is a schematic diagram illustrating another embodiment of the invention employing three prisms and a wire grid polarizer.
Figure 5:
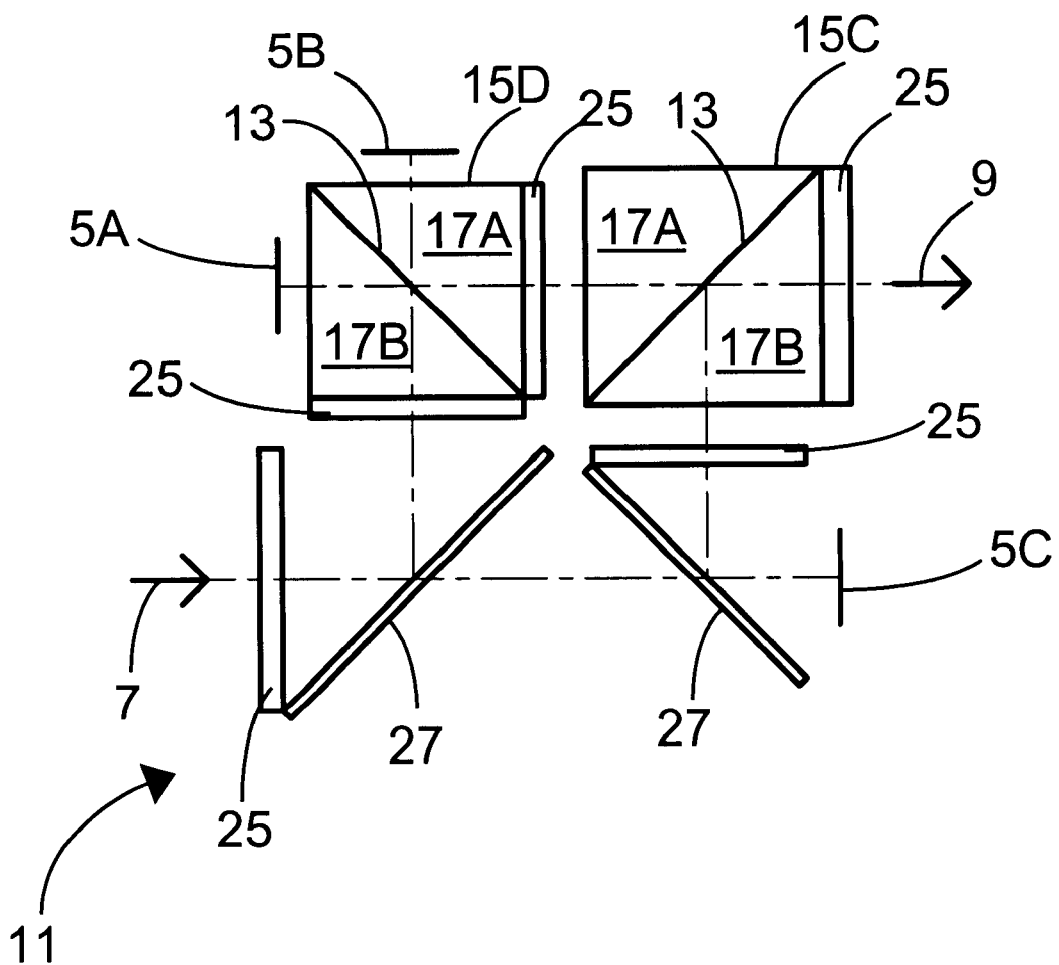
FIG. 5 is a schematic diagram illustrating a further embodiment of the invention employing two prisms and two wire grid polarizers.

FIGS. 4 and 5 show variations of the system of FIG. 1 wherein a wire grid polarizer has been substituted for one (FIG. 4) or two (FIG. 5) of the polarization beam splitters. The remaining PBS's (15B, 15C, and 15D in FIG. 4; 15C and 15D in FIG. 5) will have a construction of the type shown in FIG. 2 and the housing for these PBS's will have appropriate fixed mechanical references and locking elements like those shown in FIG. 3, adjusted to take account of the reduced number of PBSs. The housing will also include suitable fixtures for mounting the wire grid polarizers. The wire grid polarizers can be of the type manufactured by MOXTEK (Orem, Utah, USA) under the PROFLUX trademark. See also U.S. Pat. No. 6,122,103.

From the foregoing, it can be seen that the prism positioning system of the invention has the following benefits:

1. The system provides a drop-in assembly method which does not require alignment.
2. The accuracy of a diagonal's positioning does not depend on the PBS geometry or the accuracy of the filters (e.g., COLORSELECT™ filters) mounted on the PBS. Rather, it depends on the accuracy of the pad positioning and spacer geometry, which can be provided by fabricated mechanical components.
3. The system provides low assembly costs.
4. The system provides high assembly yields since if one of the components in the assembly is damaged or defective, it can be replaced without damaging the other components.

Although specific embodiments of the invention have been described and illustrated, it is to be understood that modifications can be made without departing from the invention's spirit and scope. For example, although it is preferred that each prism and its associated light-dividing diagonal is positioned independently of all other prisms in an assembly, the invention can be employed for only a subset of the prisms of an assembly (including only one prism of an assembly), with the remaining prisms being cemented together and positioned as one or more groups.

Also, although the invention has been illustrated in terms of a prism diagonal which divides incident light based on polarization, the invention can be used with prism diagonals that divide light based on color, e.g., prisms whose diagonals comprise a dichroic coating. Such dichroic prisms can have the same geometrical configuration as shown in FIG. 2 or can comprise two sub-prisms and a plane parallel plate between the sub-prisms which constitutes the prism's light-dividing diagonal. The plane parallel plate can extend above and below the sub-prisms to form the top and bottom mechanical reference surfaces which engage the fixed mechanical references of the prism's housing.

As a further variation, the number of fixed mechanical references used for an individual prism can differ from that shown in FIG. 3. For example, instead of four fixed mechanical references for the light dividing diagonal, i.e., two at the top and two at the bottom, only three can be used, e.g., two at the top and one at the bottom or vice versa. Similarly, although the use of side-engaging fixed mechanical references at both the top and bottom of the prism is preferred, one of these fixed mechanical references can be eliminated if desired. More generally, the minimum number of fixed mechanical references needed to define the position of the light-dividing diagonal is four—three which engage the diagonal and one which engages a side of the prism, with the locking element being appropriately located to effectively press the prism against the four fixed references.

As to locking elements, although spring loaded lockers are preferred because of their low cost and ready availability, other force applying locking elements can be used if desired. For example, lockers which employ a resilient polymeric material which is compressed during positioning of the prism can be used, rather than a metallic spring. A turn screw or similar mechanical force generator, e.g., a cam mechanism, can also be used for this purpose if desired.

Additional variations include using prisms of differing heights with the housing and its associated fixed mechanical references being adjusted to accommodate those heights, e.g., the housing can have a stepped configuration. In connection with these or other embodiments, the housing can, and typically will, comprise multiple components connected to one another.

In addition to using prisms of different heights, the heights of mechanical reference surfaces 19A and 19B can vary both between prisms and/or for a given prism, e.g., mechanical reference surface 19A can be longer than (or shorter than) reference surface 19B for a given prism and the dimensions of the reference surfaces can be different for different prisms in an assembly. Also, although using two sub-prisms of different heights is the preferred approach for producing the mechanical reference surfaces, other approaches can be used if desired, e.g., one of the sub-prisms can be formed with or machined to have projecting portions at its top and bottom which will serve as mechanical reference surfaces or projections can be attached to a sub-prism using a suitable cement or other fixation technique.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. An optical assembly comprising:
   (A) at least one prism which has a top, a bottom, a plurality of sides, and a diagonal which has a top and a bottom, said prism comprising:
      (i) first and second sub-prisms, each of which has a surface that is parallel to the diagonal, and
      (ii) a first mechanical reference surface for the top of the diagonal and a second mechanical reference surface for the bottom of the diagonal; and (B) a housing comprising:
  (i) a plurality of fixed mechanical references, each of which is adapted to engage one of the first mechanical reference surface, the second mechanical reference surface, or a first side of the prism; and
  (ii) a locking element which engages a second side of the prism and presses the first side and the first and second mechanical reference surfaces against the plurality of fixed mechanical references.

2. The optical assembly of claim 1 wherein:
  (a) the first mechanical reference surface comprises an extension of the parallel-to-the-diagonal surface of the first sub-prism above the parallel-to-the-diagonal surface of the second sub-prism; and
  (b) the second mechanical reference surface comprises an extension of the parallel-to-the-diagonal surface of the first sub-prism below the parallel-to-the-diagonal surface of the second sub-prism.

3. The optical assembly of claim 1 wherein: (i) the prism has third and fourth sides, and (ii) the first, third, and fourth sides are adapted to transmit light during use of the optical assembly.

4. The optical assembly of claim 1 wherein the assembly comprises four prisms arranged in a quadrangle, each of the prisms having a first side, a second side, and first and second mechanical reference surfaces, and the housing comprises fixed mechanical references and locking elements for each of the four prisms.

5. The optical assembly of claim 1 wherein the assembly comprises three prisms and a wire grid polarizer arranged in a quadrangle, each of the prisms having a first side, a second side, and first and second mechanical reference surfaces, and the housing comprises fixed mechanical references and locking elements for each of the three prisms.

6. The optical assembly of claim 1 wherein the assembly comprises two prisms and two wire grid polarizers arranged in a quadrangle, each of the prisms having a first side, a second side, and first and second mechanical reference surfaces, and the housing comprises fixed mechanical references and locking elements for each of the two prisms.

7. A prism which has a top, a bottom, a plurality of sides, and a diagonal which has a top and a bottom, said prism comprising:
  (A) first and second sub-prisms, each of which has a surface that is parallel to the diagonal;
  (B) a first mechanical reference surface for the top of the diagonal which comprises an extension of the parallel-to-the-diagonal surface of the first sub-prism above the parallel-to-the-diagonal surface of the second sub-prism; and
  (C) a second mechanical reference surface for the bottom of the diagonal which comprises an extension of the parallel-to-the-diagonal surface of the first sub-prism below the parallel-to-the-diagonal surface of the second sub-prism.

8. The prism of claim 7 wherein the prism has four sides, three of which are adapted to transmit light during use of the prism.

9. The prism of claim 7 wherein at least one of the prism's sides comprises a filter.

10. The prism of claim 9 wherein the filter is a polarization converting filter.

11. A method for positioning a prism, said prism having a diagonal which has a top and a bottom, said method comprising:
  (A) providing a first mechanical reference surface for the top of the diagonal;
  (B) providing a second mechanical reference surface for the bottom of the diagonal;
  (C) providing a plurality of fixed mechanical references, each of which is adapted to engage one of the first mechanical reference surface or the second mechanical reference surface; and
  (D) applying a force to the prism to press the first and second mechanical reference surfaces against the plurality of fixed mechanical references.

12. The method of claim 11 wherein:
  (a) the prism has a side;
  (b) in step (C), a fixed mechanical reference is provided which is adapted to engage the side; and
  (b) in step (D), the force presses the side against said fixed mechanical reference.

13. A method for positioning a prism, said prism (i) having a diagonal which has a top and a bottom and (ii) comprising first and second sub-prisms, each of which has a surface that is parallel to the diagonal, said method comprising:
  (A) providing a first mechanical reference surface for the top of the diagonal which comprises an extension of the parallel-to-the-diagonal surface of the first sub-prism above the parallel-to-the-diagonal surface of the second sub-prism;
  (B) providing a second mechanical reference surface for the bottom of the diagonal which comprises an extension of the parallel-to-the-diagonal surface of the first sub-prism below the parallel-to-the-diagonal surface of the second sub-prism;
  (C) providing a plurality of fixed mechanical references, each of which is adapted to engage one of the first mechanical reference surface or the second mechanical reference surface; and
  (D) applying a force to the prism to press the first and second mechanical reference surfaces against the plurality of fixed mechanical references.

14. The method of claim 13 wherein:
  (a) the prism has a side;
  (b) in step (C), a fixed mechanical reference is provided which is adapted to engage the side; and
  (b) in step (D), the force presses the side against said fixed mechanical reference.

* * * * *